US012385605B2

(12) United States Patent
Wilcox et al.

(10) Patent No.: US 12,385,605 B2
(45) Date of Patent: Aug. 12, 2025

(54) THREE DIMENSIONAL LED DEVICE AND METHOD OF MANUFACTURE

(71) Applicant: CreeLED, Inc., Durham, NC (US)

(72) Inventors: Robert Wilcox, Rolesville, NC (US); Michael Check, Holly Springs, NC (US); Colin Blakely, Raleigh, NC (US); David Suich, Durham, NC (US); Joseph G. Sokol, Durham, NC (US); Andre Pertuit, Raleigh, NC (US)

(73) Assignee: CreeLED, Inc., Durham, NC (US)

( * ) Notice: Subject to any disclaimer, the term of this patent is extended or adjusted under 35 U.S.C. 154(b) by 0 days.

(21) Appl. No.: 18/800,861

(22) Filed: Aug. 12, 2024

(65) Prior Publication Data

US 2024/0401756 A1 Dec. 5, 2024

Related U.S. Application Data

(62) Division of application No. 18/198,339, filed on May 17, 2023, now Pat. No. 12,078,300.

(51) Int. Cl.

| | |
|---|---|
| ***F21K 9/237*** | (2016.01) |
| ***F21K 9/90*** | (2016.01) |
| ***F21V 19/00*** | (2006.01) |
| ***F21V 29/71*** | (2015.01) |
| *F21Y 113/17* | (2016.01) |
| *F21Y 115/10* | (2016.01) |

(52) U.S. Cl.

CPC ................ *F21K 9/237* (2016.08); *F21K 9/90* (2013.01); *F21V 19/005* (2013.01); *F21V 29/713* (2015.01); *F21Y 2113/17* (2016.08); *F21Y 2115/10* (2016.08)

(58) Field of Classification Search

CPC .......... F21K 9/237; F21K 9/90; F21V 19/005; F21V 29/713; F21Y 2113/17; F21Y 2115/10

See application file for complete search history.

(56) References Cited

U.S. PATENT DOCUMENTS 4,781,601 A 11/1988 Kuhl et al.
6,578,979 B2 6/2003 Truttmann-Battig
(Continued)

OTHER PUBLICATIONS

Non-Final Office Action and Examiner-Initiated Interview Summary for U.S. Appl. No. 18/198,339, mailed Jan. 9, 2024, 10 pages.
(Continued)

*Primary Examiner* — Evan P Dzierzynski
(74) *Attorney, Agent, or Firm* — Withrow & Terranova, P.L.L.C.

(57) ABSTRACT

Solid-state lighting devices, and more particularly to a three-dimensional (3D) light-emitting diode (LED) device and a method of manufacture are disclosed. A submount of the LED can have several submount portions that are angled with respect to each other, and LED chips can be mounted on each submount portion, such that the LED chips of the device are angled at different angles with respect to each other. In an embodiment, the LED device can include a heatsink that is in contact with each of the submount portions to channel heat away from the LED chips. The LED chips can be mounted on the submount portions when all submount portions are laying flat, and then the submount portions can be pushed or punched into their respective angles.

11 Claims, 14 Drawing Sheets

(56) References Cited

U.S. PATENT DOCUMENTS

| | | | | |
|---|---|---|---|---|
| 7,690,813 | B2 | 4/2010 | Kanamori et al. | |
| 7,926,974 | B2 | 4/2011 | Wung et al. | |
| 9,475,694 | B2 * | 10/2016 | Martizon, Jr. | B81C 3/008 |
| 10,629,574 | B2 | 4/2020 | Bolognia | |
| 2005/0265019 | A1 | 12/2005 | Sommers et al. | |
| 2009/0175041 | A1 | 7/2009 | Yuen et al. | |
| 2009/0323323 | A1 | 12/2009 | Liu et al. | |
| 2011/0235321 | A1 * | 9/2011 | Ivey | F21V 29/74 362/218 |
| 2011/0303929 | A1 | 12/2011 | Strickler et al. | |
| 2014/0020882 | A1 * | 1/2014 | Konishi | F21S 41/141 165/185 |
| 2015/0219328 | A1 | 8/2015 | Lee et al. | |
| 2016/0178166 | A1 * | 6/2016 | Motoki | F21V 19/002 313/511 |
| 2018/0235082 | A1 * | 8/2018 | Salter | H01R 43/0256 |

OTHER PUBLICATIONS

Notice of Allowance for U.S. Appl. No. 18/198,339, mailed May 1, 2024, 9 pages.

* cited by examiner

THREE DIMENSIONAL LED DEVICE AND METHOD OF MANUFACTURE

RELATED APPLICATIONS

This application is a division of U.S. patent application Ser. No. 18/198,339, filed May 17, 2023, now U.S. Pat. No. 12,078,300, the disclosure of which is hereby incorporated herein by reference in its entirety.

FIELD OF THE DISCLOSURE

The present disclosure relates to a light-emitting diode (LED) device and more particularly to a three-dimensional LED device and method for manufacturing the same.

BACKGROUND

Solid-state lighting devices such as light-emitting diodes (LEDs) are increasingly used in both consumer and commercial applications. Advancements in LED technology have resulted in highly efficient and mechanically robust light sources with a long service life. Accordingly, modern LEDs have enabled a variety of new display applications and are being increasingly utilized for general illumination applications, often replacing incandescent and fluorescent light sources.

LEDs are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions. An LED chip typically includes an active region that may be fabricated, for example, from gallium nitride, gallium phosphide, aluminum nitride, gallium arsenide-based materials, and/or from organic semiconductor materials. Photons generated by the active region are initiated in all directions.

LED packages have been developed that can provide mechanical support, electrical connections, and encapsulation for LED emitters. Lumiphoric materials, such as phosphors, may also be arranged in close proximity to LED emitters to convert portions of light emissions to different wavelengths. As LED technology continues to be developed for ever-evolving modern applications, challenges exist in keeping up with operating demands for LED packages and related elements of LED packages.

LED packages that are designed to provide wide area illumination generally include a number of LED devices mounted in different orientations such that the LED chips in the LED devices emit light in different directions. The LED chips are conventionally oriented in an LED device in a single orientation, thus requiring multiple LED devices to achieve wide area light distribution of greater than 180 degrees.

The art continues to seek improved LEDs and solid-state lighting devices having desirable illumination characteristics capable of overcoming challenges associated with conventional lighting devices.

SUMMARY

The present disclosure relates to solid-state lighting devices, and more particularly to a three-dimensional (3D) light-emitting diode (LED) device and a method of manufacture. A submount of the LED can have several submount portions that are angled with respect to each other, and LED chips can be mounted on each submount portion, such that the LED chips of the device are angled at different angles with respect to each other. In an embodiment, the LED device can include a heatsink that is in contact with each of the submount portions to channel heat away from the LED chips. The LED chips can be mounted on the submount portions when all submount portions are laying flat, and then the submount portions can be pushed or punched into their respective angles.

In an embodiment, an LED device can include a submount comprising a plurality of submount portions that have respective surfaces that are angled with respect to each other and with respect to a surface of a remainder of the submount and an LED chip that is mounted on each of the respective surfaces of the plurality of submount portions.

In an embodiment, the plurality of submount portions comprise electrical traces upon which the plurality LED chips are mounted.

In an embodiment the plurality of submount portions are not in direct contact with each other.

In an embodiment the LED device can include a heat sink in contact with each of the plurality of submount portions.

In an embodiment the LED device can include an LED chip mounted on a top surface of the heat sink with a normal that is parallel to the surface of the remainder of the submount.

In an embodiment the LED device can include a cover structure covering the plurality of submount portions and LED chips.

In an embodiment each submount portion of the plurality of submount portions comprise a plurality of LED chips mounted thereon.

In an embodiment each LED chip of the plurality of LED chips is configured to emit a different color of light.

In an embodiment the plurality of submount portions are at least one of a triangular or quadrilateral shape.

In an embodiment a method of fabricating an LED device includes mounting a plurality of LED chips on a top surface of a plurality of submount portions of a submount, wherein the plurality of submount portions are coplanar with respect to a remainder of the submount and inserting a punch through the submount between the plurality of submount portions, wherein in response to the inserting the punch, the plurality of submount portions are angled with respect to each other and to the remainder of the submount.

In an embodiment, the method includes scoring one or more edges of the plurality of submount portions prior to inserting the punch.

In an embodiment, the plurality of LED chips are mounted on electrical traces that flex in response to inserting the punch.

In an embodiment, the method includes controlling a distance through which the punch is inserted through the submount based on a predetermined angle of the plurality of submount portions with respect to the remainder of the submount.

In an embodiment, the method includes placing a heat sink between the plurality of submount portions, such that the heatsink is in contact with a surface of each submount portion of the plurality of submount portions.

In an embodiment, the punch comprises a heatsink at a tip of the punch, and the method further includes detaching the heatsink from the punch, wherein the heatsink is in contact with, and connected to surfaces of the plurality of submount portions and retracting the punch.

In an embodiment, the method includes inserting the punch through a bottom surface of the plurality of submount portions, causing a top surface of plurality of submount portions to be angled away from the punch.

In an embodiment the method includes inserting the punch through a top surface of each of the plurality of submount portions, one at a time, causing a top surface of plurality of submount portions to be angled towards the punch.

In an embodiment, each submount portion of the plurality of submount portions comprises a plurality of LED chips mounted thereon.

In an embodiment, each LED chip of the plurality LED chips is configured to emit a different color light.

In an embodiment, the plurality of submount portions are at least one of a triangular or quadrilateral shape.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
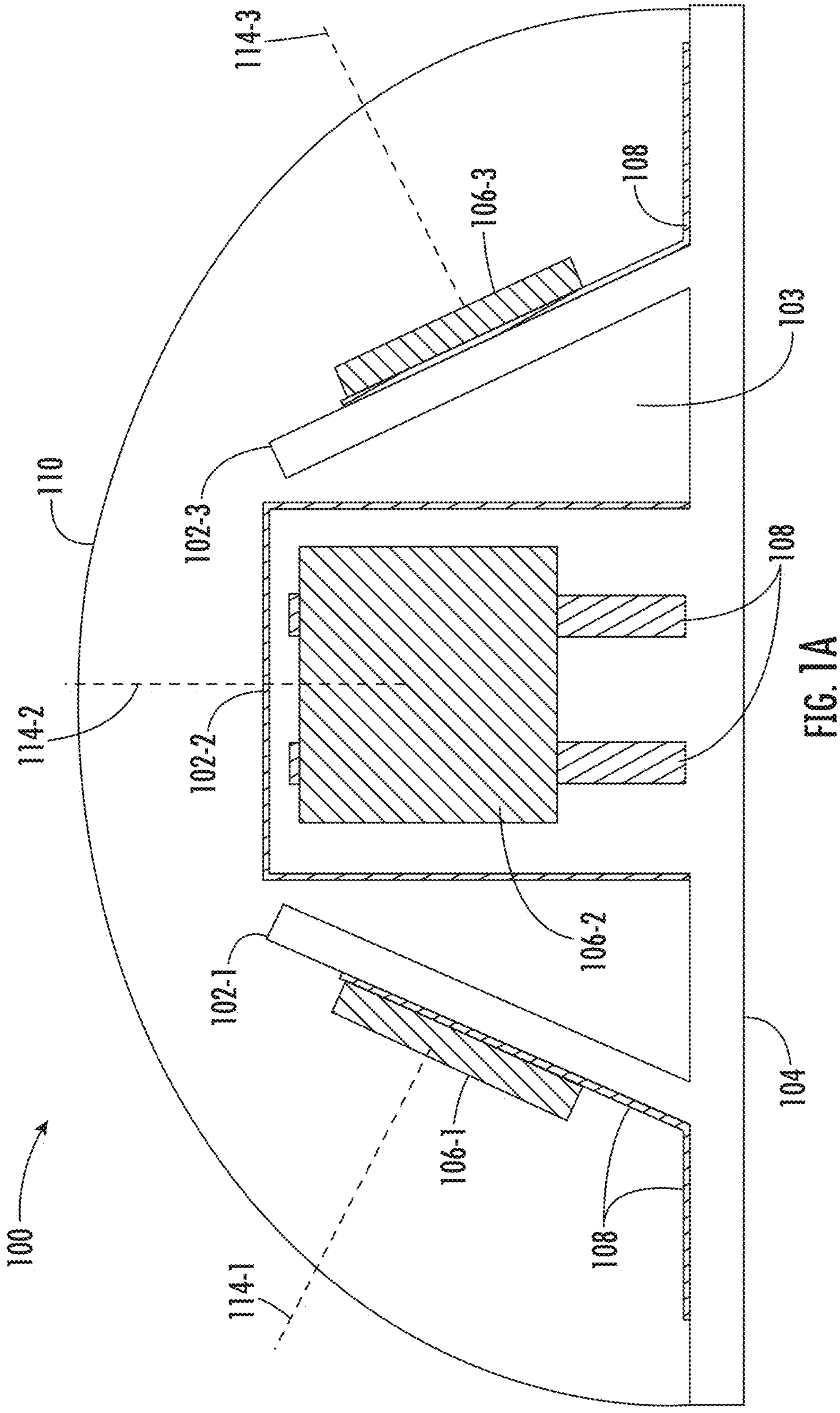
FIG. 1A is a cross-sectional view of a light-emitting diode (LED) device with a plurality of LED chips that are angled with respect to each other according to aspects disclosed herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to solid-state lighting devices, and more particularly to a three-dimensional (3D) light-emitting diode (LED) device and a method of manufacture. A submount of the LED can have several submount portions that are angled with respect to each other, and LED chips can be mounted on each submount portion, such that the LED chips of the device are angled at different angles with respect to each other. In an embodiment, the LED device can include a heatsink that is in contact with each of the submount portions to channel heat away from the LED chips. The LED chips can be mounted on the submount portions when all submount portions are laying flat, and then the submount portions can be pushed or punched into their respective angles.

Before delving into specific details of various aspects of the present disclosure, an overview of various elements that may be included in exemplary LED packages is provided for context. An LED chip typically comprises an active LED structure or region that can have many different semiconductor layers arranged in different ways. The fabrication and operation of LEDs and their active structures are generally known in the art and are only briefly discussed herein. The layers of the active LED structure can be fabricated using known processes with a suitable process being fabrication using metal organic chemical vapor deposition. The layers of the active LED structure can comprise many different layers and generally comprise an active layer sandwiched between n-type and p-type oppositely doped epitaxial layers, all of which are formed successively on a growth substrate. It is understood that additional layers and elements can also be included in the active LED structure, including, but not limited to, buffer layers, nucleation layers, super lattice structures, un-doped layers, cladding layers, contact layers, and current-spreading layers and light extraction layers and elements. The active layer can comprise a single quantum well, a multiple quantum well, a double heterostructure, or super lattice structures.

The active LED structure can be fabricated from different material systems, with some material systems being Group III nitride-based material systems. Group III nitrides refer to those semiconductor compounds formed between nitrogen (N) and the elements in Group III of the periodic table, usually aluminum (Al), gallium (Ga), and indium (In). Gallium nitride (GaN) is a common binary compound. Group III nitrides also refer to ternary and quaternary compounds such as aluminum gallium nitride (AlGaN), indium gallium nitride (InGaN), and aluminum indium gallium nitride (AlInGaN). For Group III nitrides, silicon (Si) is a common n-type dopant and magnesium (Mg) is a common p-type dopant. Accordingly, the active layer, n-type layer, and p-type layer may include one or more layers of GaN, AlGaN, InGaN, and AlInGaN that are either undoped or doped with Si or Mg for a material system based on Group III nitrides. Other material systems include silicon carbide (SiC), organic semiconductor materials, and other Group III-V systems such as gallium phosphide (GaP), gallium arsenide (GaAs), and related compounds. The active LED structure may be grown on a growth substrate that can include many materials, such as sapphire, SiC, aluminum nitride (AlN), and GaN, with a suitable substrate being a 4H polytype of SiC, although other SiC polytypes can also be used including 3C, 6H, and 15R polytypes.

Different embodiments of the active LED structure can emit different wavelengths of light depending on the composition of the active layer and n-type and p-type layers. In some embodiments, the active LED structure emits blue light with a peak wavelength range of approximately 430 nanometers (nm) to 480 nm. In other embodiments, the active LED structure emits green light with a peak wavelength range of 500 nm to 570 nm. In other embodiments, the active LED structure emits red light with a peak wavelength range of 600 nm to 650 nm. In certain embodiments, the active LED structure may be configured to emit light that is outside the visible spectrum, including one or more portions of the ultraviolet (UV) spectrum. The UV spectrum is typically divided into three wavelength range categories denoted with letters A, B, and C. In this manner, UV-A light is typically defined as a peak wavelength range from 315 nm to 400 nm, UV-B is typically defined as a peak wavelength range from 280 nm to 315 nm, and UV-C is typically defined as a peak wavelength range from 100 nm to 280 nm.

An LED chip can also be covered with one or more lumiphoric materials (also referred to herein as lumiphors), such as phosphors, such that at least some of the light from the LED chip is absorbed by the one or more lumiphors and is converted to one or more different wavelength spectra according to the characteristic emission from the one or more lumiphors. In this regard, at least one lumiphor receiving at least a portion of the light generated by the LED source may re-emit light having different peak wavelength than the LED source. An LED source and one or more lumiphoric materials may be selected such that their combined output results in light with one or more desired characteristics such as color, color point, intensity, etc. In certain embodiments, aggregate emissions of LED chips, optionally in combination with one or more lumiphoric materials, may be arranged to provide cool white, neutral white, or warm white light, such as within a color temperature range of from 1800K to 10,000K. In certain embodiments, lumiphoric materials having cyan, green, amber, yellow, orange, and/or red peak wavelengths may be used. In some embodiments, the combination of the LED chip and the one or more lumiphors (e.g., phosphors) emits a generally white combination of light. The one or more phosphors may include yellow (e.g., YAG:Ce), green (e.g., LuAg:Ce), and red (e.g., $Ca_{i-x-y}Sr_xEu_yAlSiN_3$) emitting phosphors, and combinations thereof.

Lumiphoric materials as described herein may be or include one or more of a phosphor, a scintillator, a lumiphoric ink, a quantum dot material, a day glow tape, and the like. Lumiphoric materials may be provided by any suitable means, for example, direct coating on one or more surfaces of an LED, dispersal in an encapsulant material configured to cover one or more LEDs, and/or coating on one or more optical or support elements (e.g., by powder coating, inkjet printing, or the like). In certain embodiments, lumiphoric materials may be downconverting or upconverting, and combinations of both downconverting and upconverting materials may be provided. In certain embodiments, multiple different (e.g., compositionally different) lumiphoric materials arranged to produce different peak wavelengths may be arranged to receive emissions from one or more LED chips. One or more lumiphoric materials may be provided on one or more portions of an LED chip in various configurations. In certain embodiments, one or more surfaces of LED chips may be conformally coated with one or more lumiphoric materials, while other surfaces of such LED chips may be devoid of lumiphoric material.

Light emitted by the active layer or region of an LED chip is initiated in all directions. For directional applications, internal mirrors or external reflective surfaces may be employed to redirect as much light as possible toward a desired emission direction. Internal mirrors may include single or multiple layers. Some multi-layer mirrors include a metal reflector layer and a dielectric reflector layer, wherein the dielectric reflector layer is arranged between the metal reflector layer and a plurality of semiconductor layers.

As used herein, a layer or region of a light-emitting device may be considered to be "transparent" when at least 80% of emitted radiation that impinges on the layer or region emerges through the layer or region. Moreover, as used herein, a layer or region of an LED is considered to be "reflective" or embody a "mirror" or a "reflector" when at least 80% of the emitted radiation that impinges on the layer or region is reflected. In some embodiments, the emitted radiation comprises visible light such as blue and/or green LEDs with or without lumiphoric materials. In other embodiments, the emitted radiation may comprise nonvisible light. For example, in the context of GaN-based blue and/or green LEDs, silver (Ag) may be considered a reflective material (e.g., at least 80% reflective). In the case of ultraviolet (UV) LEDs, appropriate materials may be selected to provide a desired, and in some embodiments high, reflectivity and/or a desired, and in some embodiments low, absorption. In certain embodiments, a "light-transmissive" material may be configured to transmit at least 50% of emitted radiation of a desired wavelength.

The present disclosure can be useful for LED chips having a variety of geometries, such as vertical geometry or lateral geometry. A vertical geometry LED chip typically includes anode and cathode connections on opposing sides or faces of the LED chip. A lateral geometry LED chip typically includes both anode and cathode connections on the same side of the LED chip that is opposite a substrate, such as a growth substrate. In certain embodiments, a lateral geometry LED chip may be arranged for flip-chip mounting on another surface.

According to aspects of the present disclosure, LED packages may include one or more elements, such as lumiphoric materials, encapsulants, light-altering materials, lenses, and electrical contacts, among others, that are provided with one or more LED chips. In certain aspects, an LED package may include a support member, such as a submount or a lead frame. Suitable materials for a submount include, but are not limited to, ceramic materials such as aluminum oxide or alumina, AlN, or organic insulators like polyimide (PI) and polyphthalamide (PPA). In other embodiments a submount may comprise a printed circuit board (PCB), sapphire, Si, or any other suitable material. For PCB embodiments, different PCB types can be used such as standard FR-4 PCB, metal core PCB, or any other type of PCB. In still further embodiments, the support structure may embody a lead frame structure.

As used herein, light-altering materials may include many different materials including light-reflective materials that reflect or redirect light, light-absorbing materials that absorb light, and materials that act as a thixotropic agent. As used herein, the term "light-reflective" refers to materials or particles that reflect, refract, or otherwise redirect light. For light-reflective materials, the light-altering material may include at least one of fused silica, fumed silica, titanium dioxide ($TiO_2$), or metal particles suspended in a binder, such as silicone or epoxy. For light-absorbing materials, the light-altering material may include at least one of carbon, silicon, or metal particles suspended in a binder, such as silicone or epoxy. The light-reflective materials and the light-absorbing materials may comprise nanoparticles. In certain embodiments, the light-altering material may comprise a generally white color to reflect and redirect light. In other embodiments, the light-altering material may comprise a generally opaque or black color for absorbing light and increasing contrast.

In certain applications, LED devices as disclosed herein may be well suited in closely-spaced array applications such automotive lighting, general lighting, and lighting displays. For exterior automotive lighting, multiple LED devices may be arranged under a common lens or optic to provide a single overall emission or emissions that are capable of changing between different emission characteristics. Changing emission characteristics may include toggling between high beam and low beam emissions, adaptively changing emissions, and adjusting correlated color temperatures (CCTs) that correspond with daytime and nighttime running conditions. In general lighting applications, LED devices as disclosed herein may be configured to provide modules, systems, and fixtures that are capable of providing one or more different emission colors or CCT values, such as one or more of warm white (e.g., 1800 Kelvin (K)-3000 K), neutral white (e.g., 3500 K-4500 K), and cool white (5000 K-6500 K). LED devices may also include monochromatic LEDs without phosphors that emit colors such as violet, blue, cyan, green, amber, red, and photored. For horticulture lighting applications, LED devices as disclosed herein may be arranged to provide modules, systems, and fixtures that are capable of changing between different emission characteristics that target various growth conditions of different crops.

FIG. 1A is a cross-sectional view of a light-emitting diode (LED) device 100 with a plurality of LED chips 106-1, 106-2, and 106-3 (referred to as 106 when referring to them collectively) that are angled with respect to each other according to aspects disclosed herein. The LED chips 106 can be mounted on respective submount portions 102-1, 102-2, and 102-3 (referred to as 102 when referring to them collectively) that are also angled with respect to each other. In an embodiment, the submount portions 102 can be at least partially connected to a remainder of the submount 104. In an embodiment, the LED chips 106 can be mounted on metallic electrical traces 108 that connect the submount portions 102 to the remainder of the submount 104. The LED chips 106 can be mounted on the submount portions 102 when the submount portions 102 are flat, or parallel with respect to the remainder of the submount, and after the LED chips 106 are mounted, the submount portions 102 can be manipulated such that they are at an angle with respect to each other and to the submount 104. Further details of how the submount portions 102 are manipulated, and how the LED device 100 is formed are discussed with respect to FIGS. 9A-9E.

In an embodiment, the material of the submount 104 and submount portions 102 can flex when the submount portions 102 are manipulated. In other embodiments, the material of the submount 104 and submount portions 102 may tear, either partially, or completely. In an embodiment, the metal of the electrical traces 108 can flex and maintain a connection between the electrical traces on the submount 104 and the submount portions 102. In an embodiment, the submount portions 102 may be in contact with each other before manipulation into the 3D form, but after the submount portions 102 are raised relative to the remainder of the submount 104, the submount portions 102 are not in contact with each other.

Figure 1B:
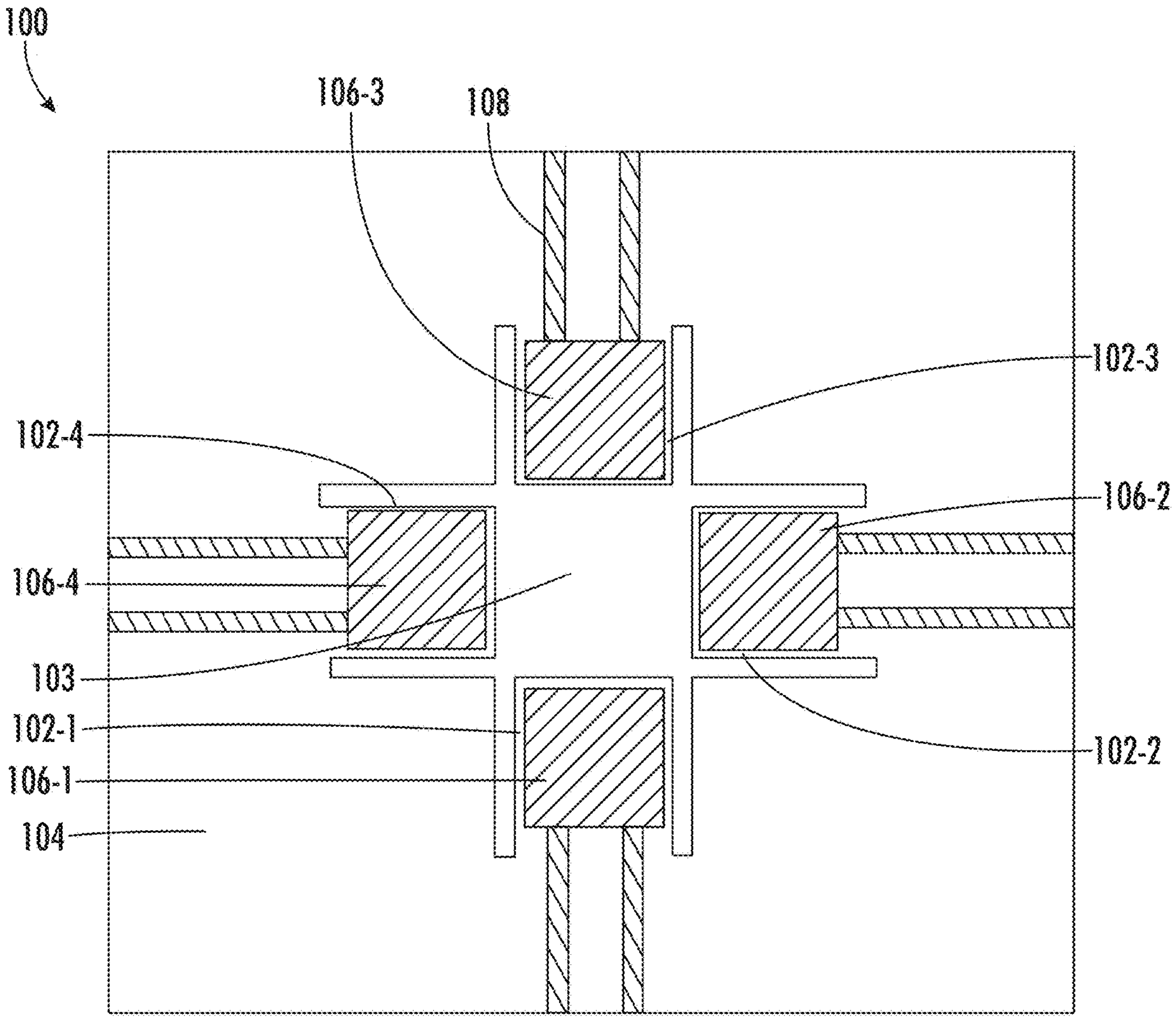
FIG. 1B is a top down view of LED device of FIG. 1A according to aspects disclosed herein.

In the embodiment depicted in FIG. 1A, and FIG. 1B, which is a top-down view of the embodiment in FIG. 1A, there can be 4 submount portions 102-1, 102-2, 102-3, and 102-4, each with an LED chip mounted thereon via the metallic electrical traces 108. It is to be appreciated that submount portion 102-4 and LED chip 106-4 are not visible in FIG. 1A as they are behind the submount portion 102-2. In the embodiment shown in FIGS. 1A and 1B, there can be 4 submount portions, each arranged symmetrically around a central location, but in other embodiments, there can be any number of submount portions, arranged in any manner, depending on the desired light emission pattern of the LED device 100. For example, the four submount portions 102 instead of being arranged uniformly 360 degrees around a central point, in other embodiments, two or more submount portions can be arranged around 180 degrees in order to provide more targeted illumination.

The normal 114-1, 114-2, and 114-3 of the submount portions 102-1, 102-2, and 102-3 can be adjusted based on the desired emission pattern. For example, the normals 114 can be adjusted so that the angle between the normal 114 and the normal of the submount 104 is small to provide just slightly broader illumination than if the LEDs 106 were flat mounted on the submount 104. In other embodiments, the angles of the normals 114 with respect to the normal of the submount 104 can be up to 90 degrees, or even higher.

In some embodiments, there can be a recess 103 between the submount portions 102. The recess 103 can be formed by a portion of the submount 104 being removed prior to the submount portions 102 being manipulated to different angles. In other embodiments, depending on the shape of the submount portions 102, the recess 103 can be formed when the submount portions 102 are lifted with respect to the remainder submount 104.

In certain embodiments, the LED device 100 may comprise a cover structure 110 that may in some embodiments comprise a conversion layer that comprises lumiphoric material, or the cover structure 110 may comprise lumiphoric material throughout the cover structure 110. The cover structure 110 may be attached to the LED chip 106 or the submount 104 on which the LED chips 106 are attached via the submount portions 102 using, for example, a layer of transparent adhesive such as silicone. It is to be appreciated that in FIG. 1A, the scale of the cover structure 110, and submount portions 102-1, 102-2, and 102-3 and LED chips 106-1, 106-2, and 106-3, are not necessarily drawn proportionally, and that in other embodiments, the cover structure 110 may be much larger with respect to the submount portions and LED chips than is shown in FIG. 1A. It is also to be appreciated that although the cover structure 110 is only shown with regard to the embodiment in FIG. 1A, the cover structure 110 can also be included in any of the embodiments in the other figures, but has not been drawn for the sake of simplicity.

Figure 2:
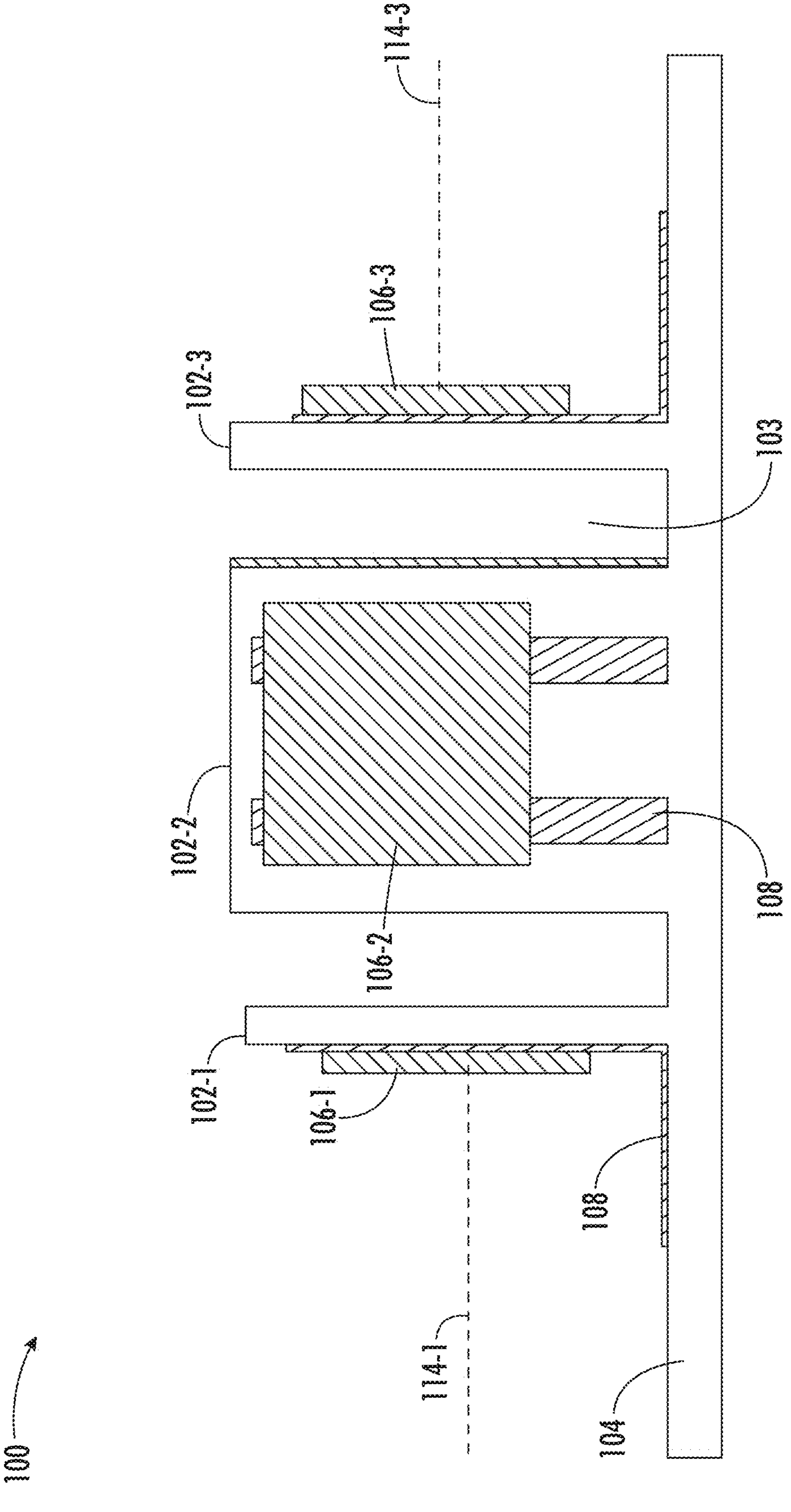
FIG. 2 is a cross-sectional view of another LED device with a plurality of LED chips that are angled with respect to each other at a different angle than shown in FIG. 1A according to aspects disclosed herein.

FIG. 2 is a cross-sectional view of another LED device 100 with a plurality of LED chips 106 that are angled with respect to each other at a different angle than shown in FIG. 1A according to aspects disclosed herein.

In the embodiment shown in FIG. 2, the submount portions 102 are oriented at 90 degrees with respect to the remainder of the submount portion 104. In this embodiment, the normal 114 of the submount portions 102 are in a plane that is parallel to the submount portion 104. In other embodiments, other angles are possible.

Figure 3:
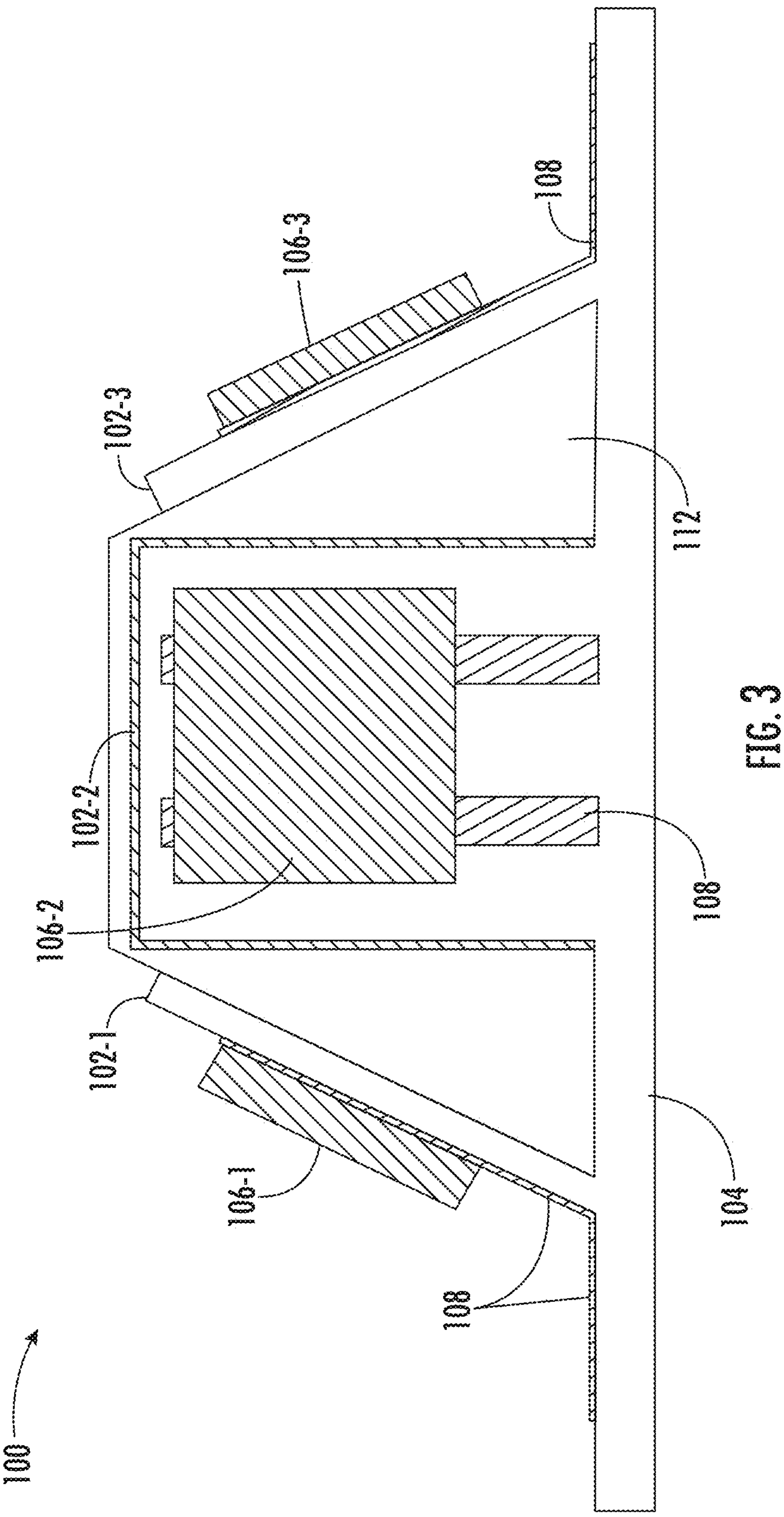
FIG. 3 is a cross-sectional view of an LED device similar to FIG. 1A with a heatsink according to aspects disclosed herein.

FIG. 3 is a cross-sectional view of an LED device similar to FIG. 1A with a heatsink according to aspects disclosed herein. The embodiment in FIG. 3 is similar to that depicted in FIG. 1A except for the addition of the heatsink 112 in the place of the recess 103. The heatsink 112 can be pyramidal in shape, with sides that are in contact with a back side surface of the submount portions 102 in order to conduct thermal energy away from the submount portions 102 in order to extend the operating life of the LED chips 106. The heatsink can be metal, e.g., copper or aluminum, or some other material with appropriate thermal properties. Although not shown, the heatsink 112 may have radiative fins or other elements to disperse the thermal energy. The heatsink 112 may also be connected to other components external to the LED device 100 that can transport thermal energy away from the LED device 100.

Figure 4:
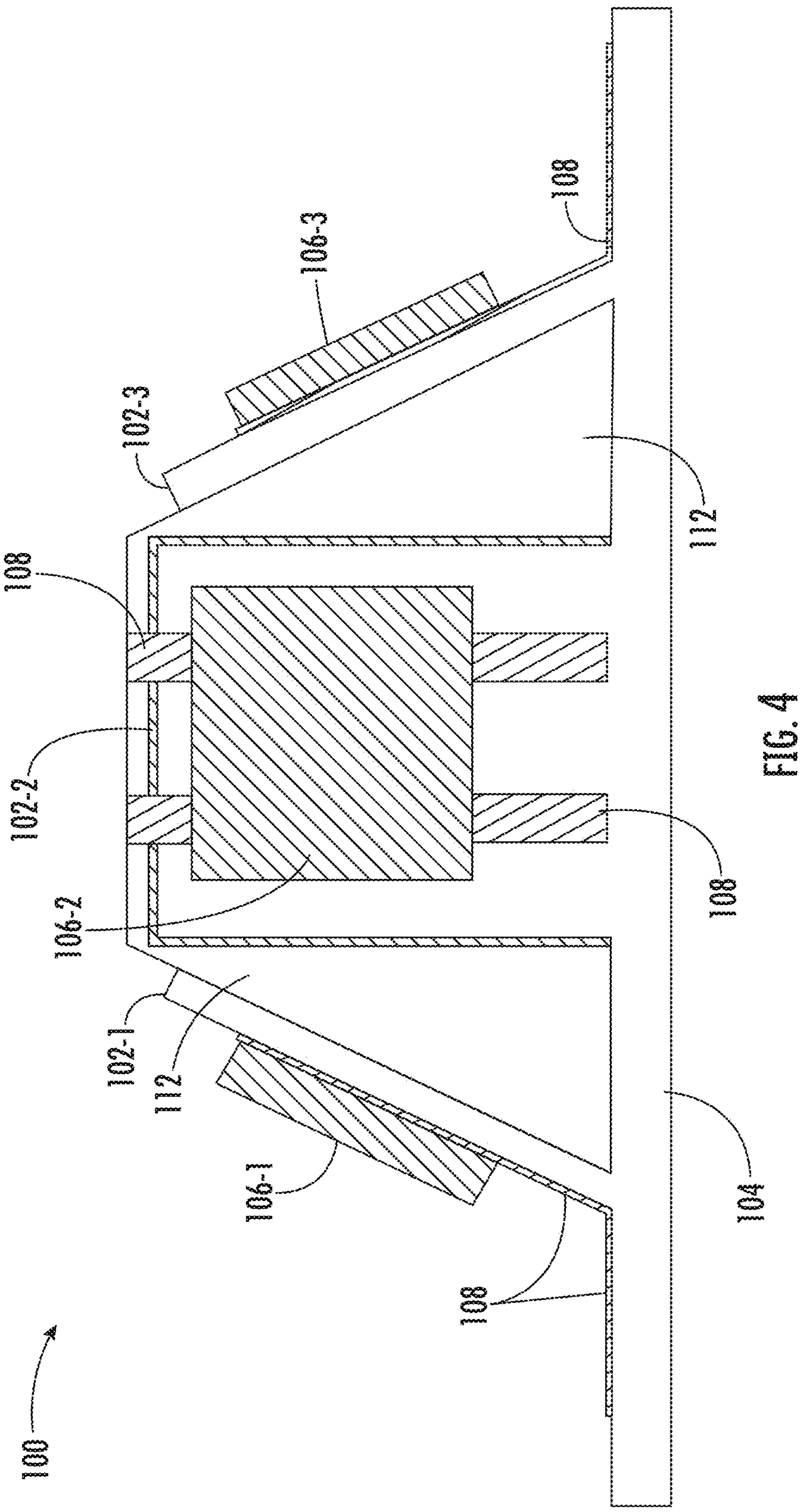
FIG. 4 is a cross-sectional view of an LED device similar to FIG. 3 with an additional LED chip mounted on the heatsink according to aspects disclosed herein.

FIG. 4 is a cross-sectional view of an LED device similar to FIG. 3 with an additional LED chip mounted on the heatsink according to aspects disclosed herein. In order to improve light emission directly opposite the LED device 100, the heatsink can have mounted thereon another LED chip 106-5. In an embodiment, the LED chip 106-5 can be powered by metal traces on the heatsink that are connected to metal traces on one of the submount portions, for example, submount portion 102-2 in the embodiment shown in FIG. 4. In other embodiments, the metal traces 108 on the heatsink may be coupled to metal traces on the remainder of the submount 104.

Figure 5A:
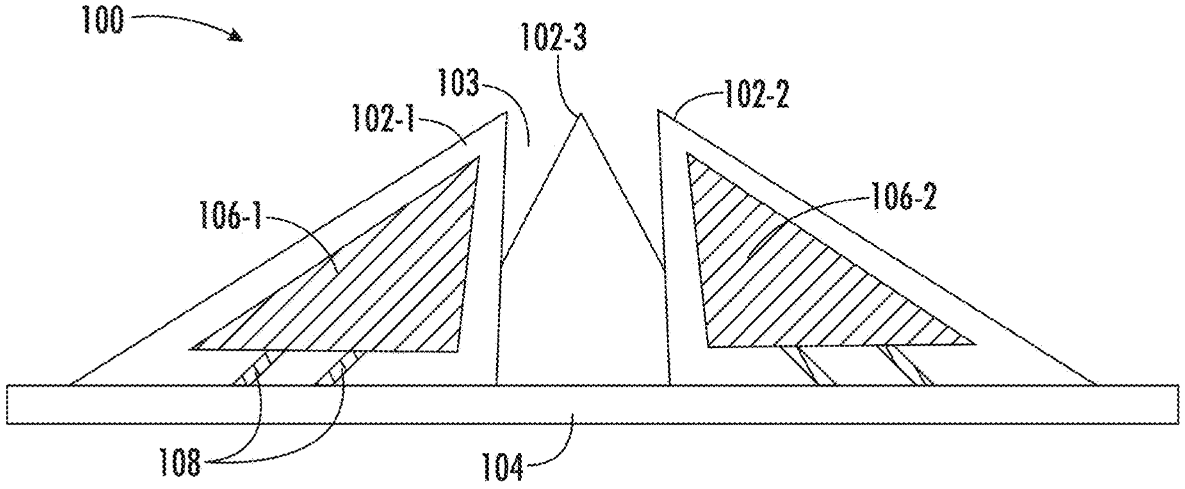
FIG. 5A is a cross-sectional view of another LED device with a plurality of LED chips that are angled with respect to each other according to aspects disclosed herein.
Figure 5B:
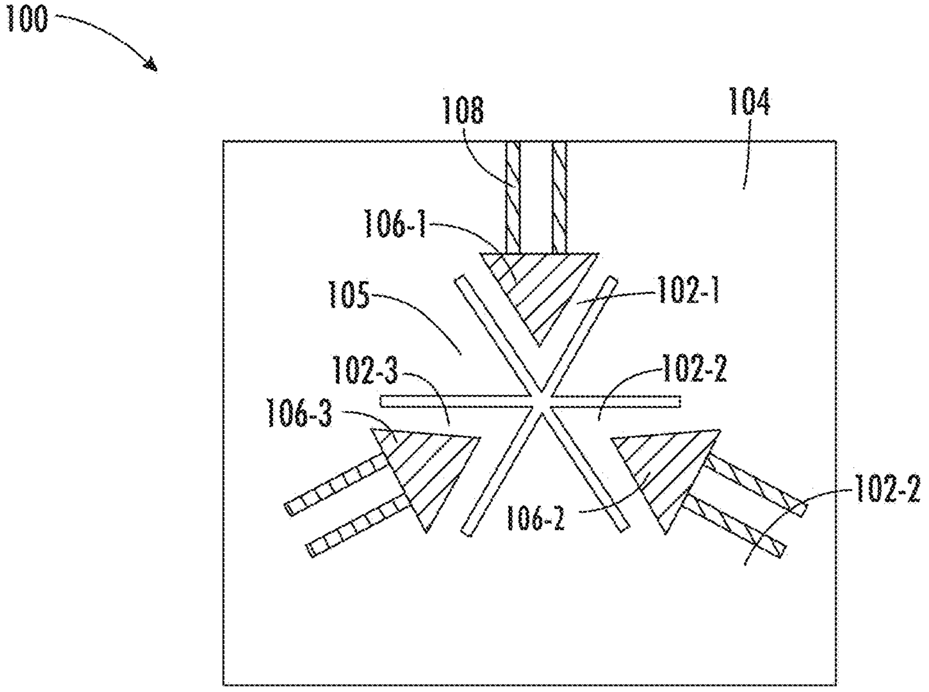
FIG. 5B is a top down view of the LED device of FIG. 5A according to aspects disclosed herein.

FIG. 5A is a cross-sectional view of another LED device with a plurality of LED chips 106 that are angled with respect to each other according to aspects disclosed herein. FIG. 5B is a top-down view of the LED device 100 of FIG. 5A according to aspects disclosed herein. The embodiment in FIGS. 5A and 5B is similar to that shown in FIGS. 1A and 1B, except that instead of being square or rectangular, the submount portions 102 in FIGS. 5A and 5B are triangular. The LED chips in FIGS. 5A and 5B are shown as being triangular too, except that in other embodiments, the LED chips 106 can be square or rectangular or any other shape, while still being mounted on triangular submount portions 102.

In the embodiment shown in FIGS. 5A and 5B, there are six submount portions but only three of which (102-1, 102-2, and 102-3) have LED chips 106 mounted thereon. The other submount portions (e.g., 105) can also be raised relative to the remainder of the submount 104, but not include LED chips 106. Alternatively, in other embodiments, the submount portions 105 can include LED chips 106 mounted thereon.

In an embodiment, due to the triangular shape of the submount portions 102, there is no recess 103 when the submount portions are flat, before being raised, but a recess 103 can be formed when the submount portions 102 are raised.

Figure 6:
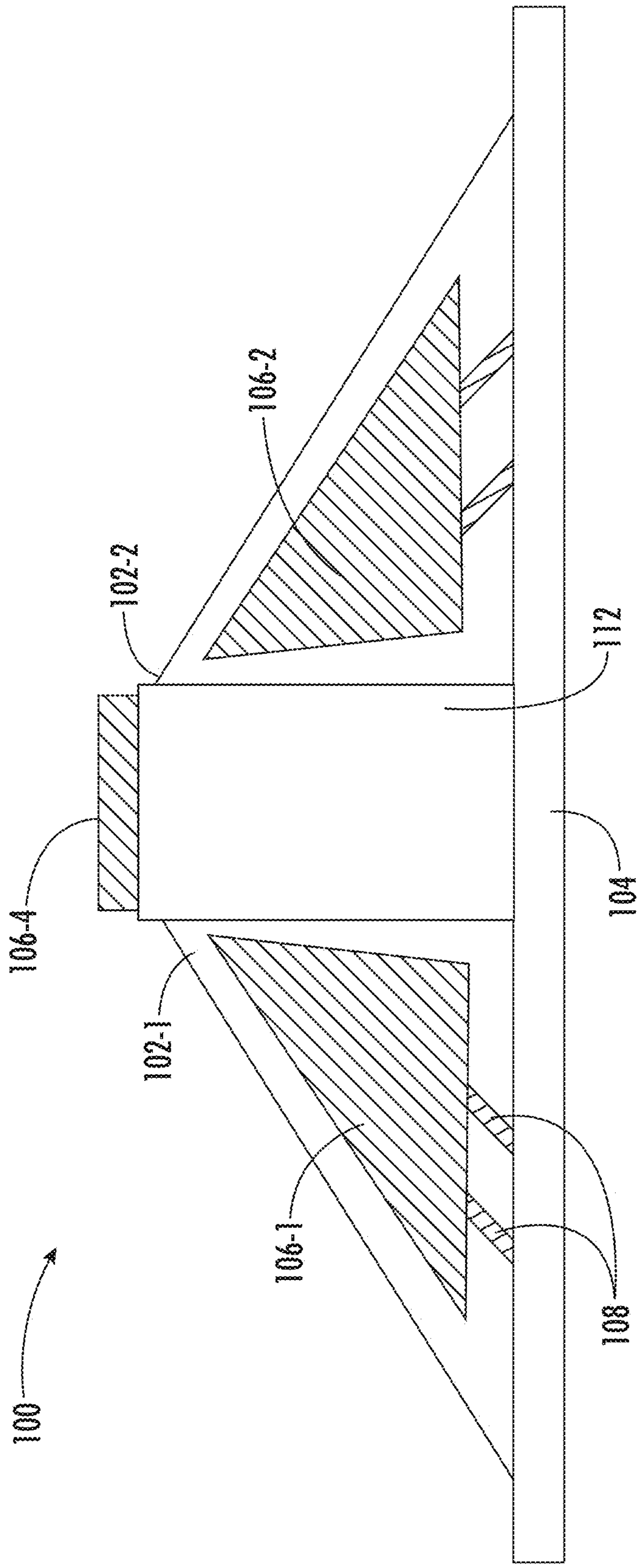
FIG. 6 is a cross-sectional view of an LED device similar to FIG. 5A with a heatsink according to aspects disclosed herein.

FIG. 6 is a cross-sectional view of an LED device similar to FIG. 5A with a heatsink 112 according to aspects disclosed herein. The heatsink 112 in FIG. 6 can be similar to the heatsink in FIGS. 3 and 4, except with a different pyramidal shape so that surfaces of the heatsink 112 can be in contact with a back surface of the submount portions 102. Optionally, the heatsink 112 in FIG. 6 can also have a LED chip 106 placed on top of the surface, like the embodiment depicted in FIG. 4.

Figure 7:
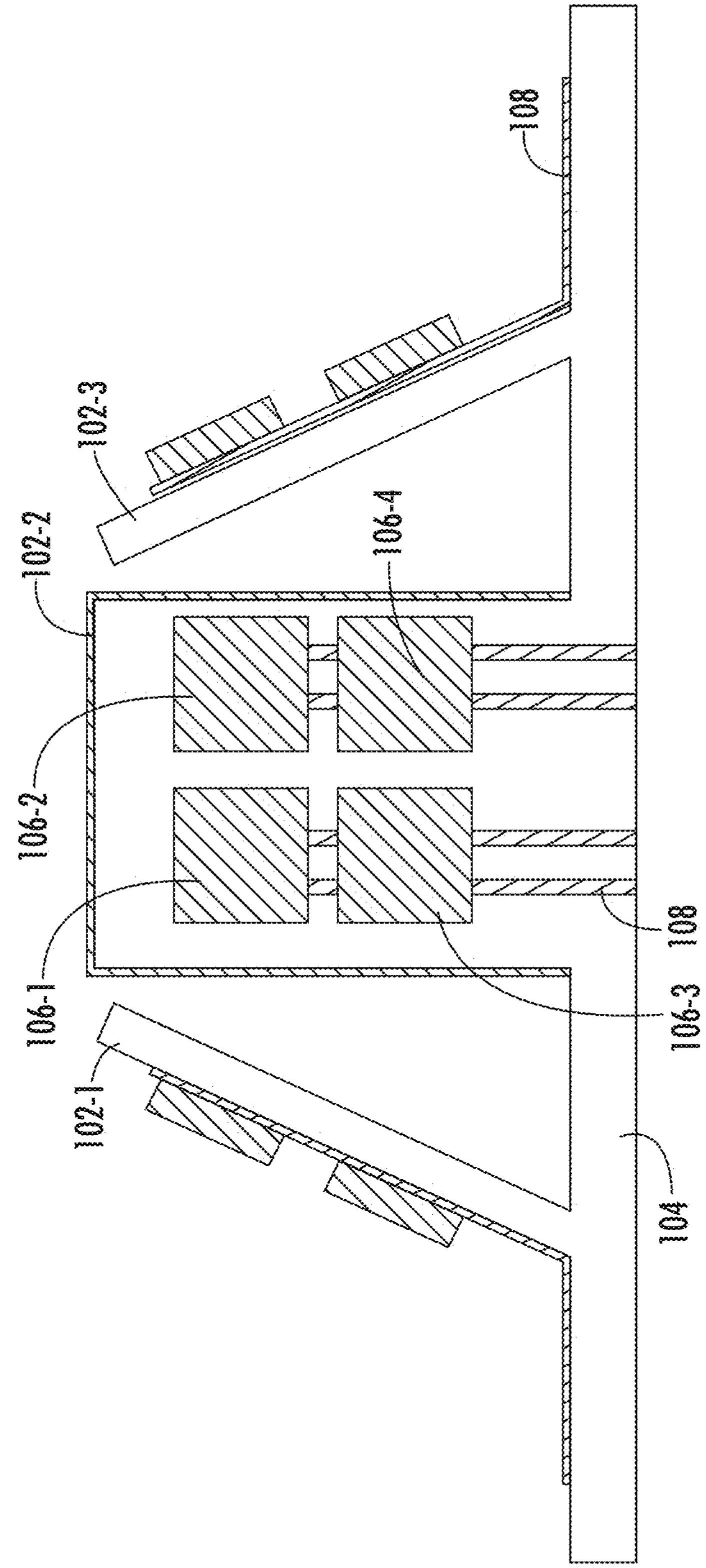
FIG. 7 is a cross-sectional view of another LED device with a plurality of LED chips on each submount portion that are angled with respect to LED chips on other submount portions according to aspects disclosed herein.

FIG. 7 is a cross-sectional view of another LED device with a plurality of LED chips 106 on each submount portion 102 that are angled with respect to LED chips 106 on other submount portions 102 according to aspects disclosed herein. In the embodiment shown in FIG. 7, each submount portion 102 can include a plurality of LED chips 106 mounted thereon. In the embodiment shown in FIG. 7 there are four LED chips 106 mounted on each submount portion 102, but in other embodiments, there can be two or more LED chips mounted on each submount portion. There can be different numbers of LED chips mounted on each submount portion in various embodiments. Also, each submount portion 102 can have LED chips of a single color, or a plurality of colors. For example, submount portion 102-2, can include LED chips 106-1, 106-2, 106-3, and 106-4. In an example, each of the LED chips 106-1, 106-2, 106-3, and 106-4 can be the same color, while LED chips on other submount portions are other colors. Alternatively, LED chip 106-1 could be white, LED chip 106-2 could be red, LED chip 106-3 could be blue, and LED chip 106-4 could be green.

Figure 8:
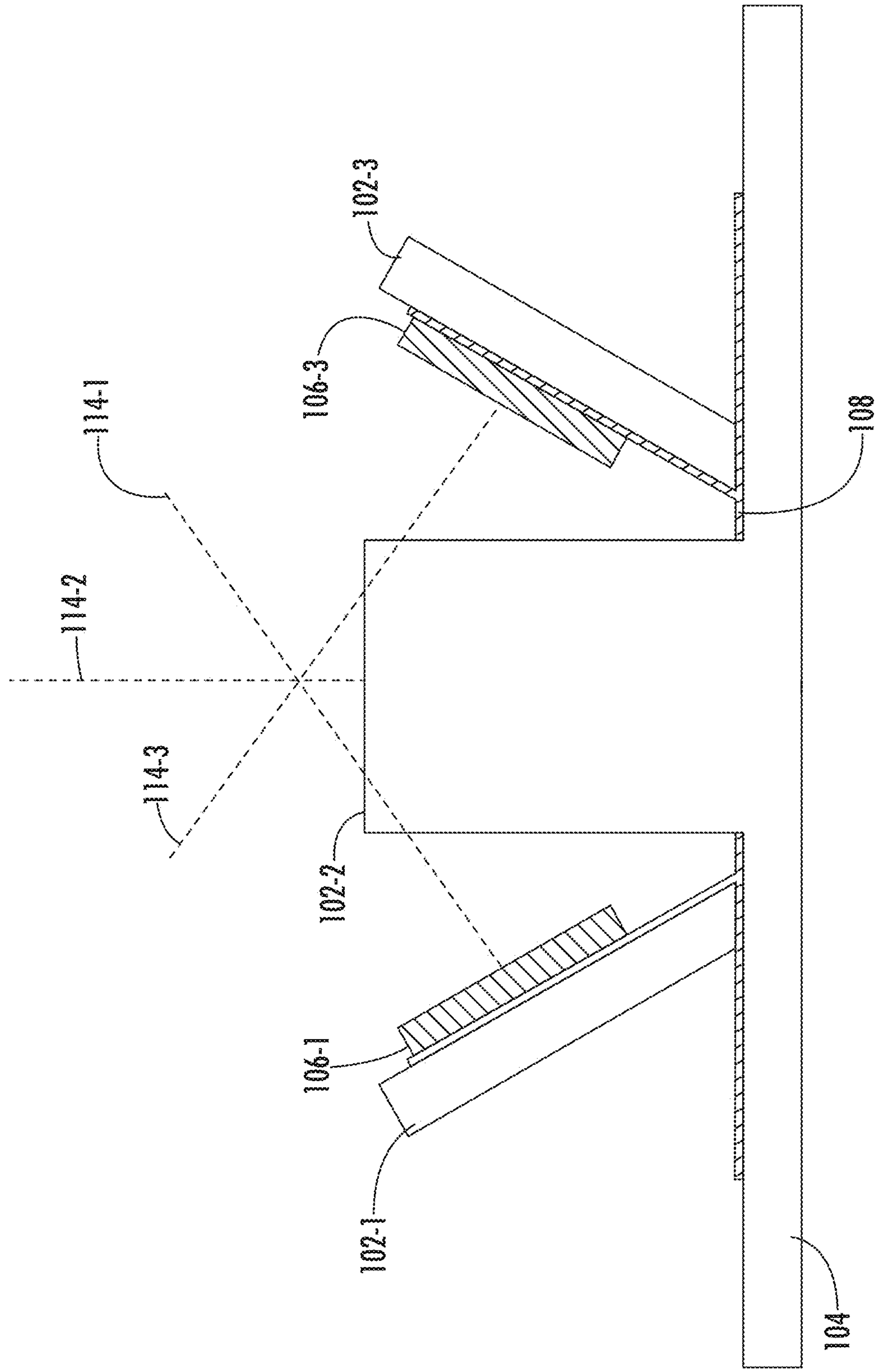
FIG. 8 is a cross-sectional view of another LED device with a plurality of LED chips that are angled with respect to each other according to aspects disclosed herein.

FIG. 8 is a cross-sectional view of another LED device with a plurality of LED chips that are angled with respect to each other according to aspects disclosed herein. In the embodiment shown in FIG. 8, the submount portions are angled so that the normals 114 of the submount portions intersect at some location away from the LED device 100. The submount portions can be angled so that the focal point is at some predetermined location depending on the desired emission pattern.

FIGS. 9A-9E depict a series of illustrations showing a method of forming an LED device with a plurality of LED chips that are angled with respect to each other according to aspects disclosed herein.

Figure 9A:
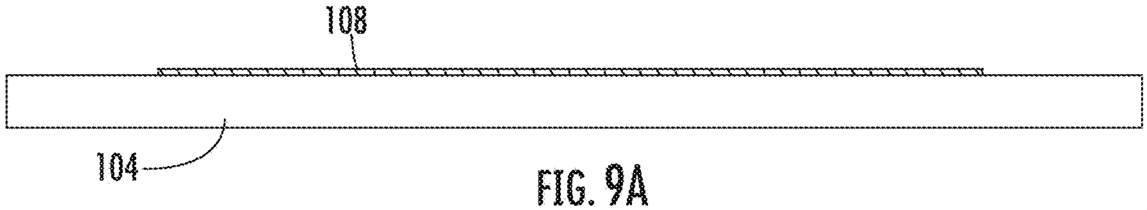
FIGS. 9A-9E depict a series of illustrations showing a method of forming an LED device with a plurality of LED chips that are angled with respect to each other according to aspects disclosed herein.

In FIG. 9A, the submount 104 can lay flat with no submount portions 102 being raised. The electrical traces 108 can then be placed on the surface of the submount 104. In an embodiment, the submount portions 102 can be scored, or completely cut while still in the flattened position.

Figure 9B:
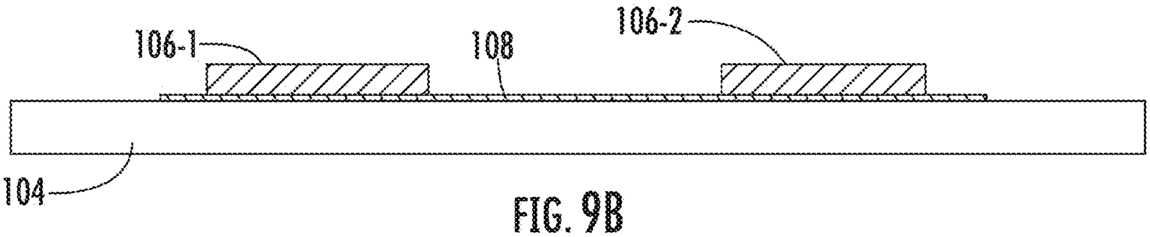

As shown in FIG. 9B, the LED chips (e.g., 106-1 and 106-2) can be placed on parts of the submount 104 that will become the submount portions 102 once raised. In an embodiment, the scoring, which is optional, may occur after the LED chips 106 are mounted.

Figure 9C:
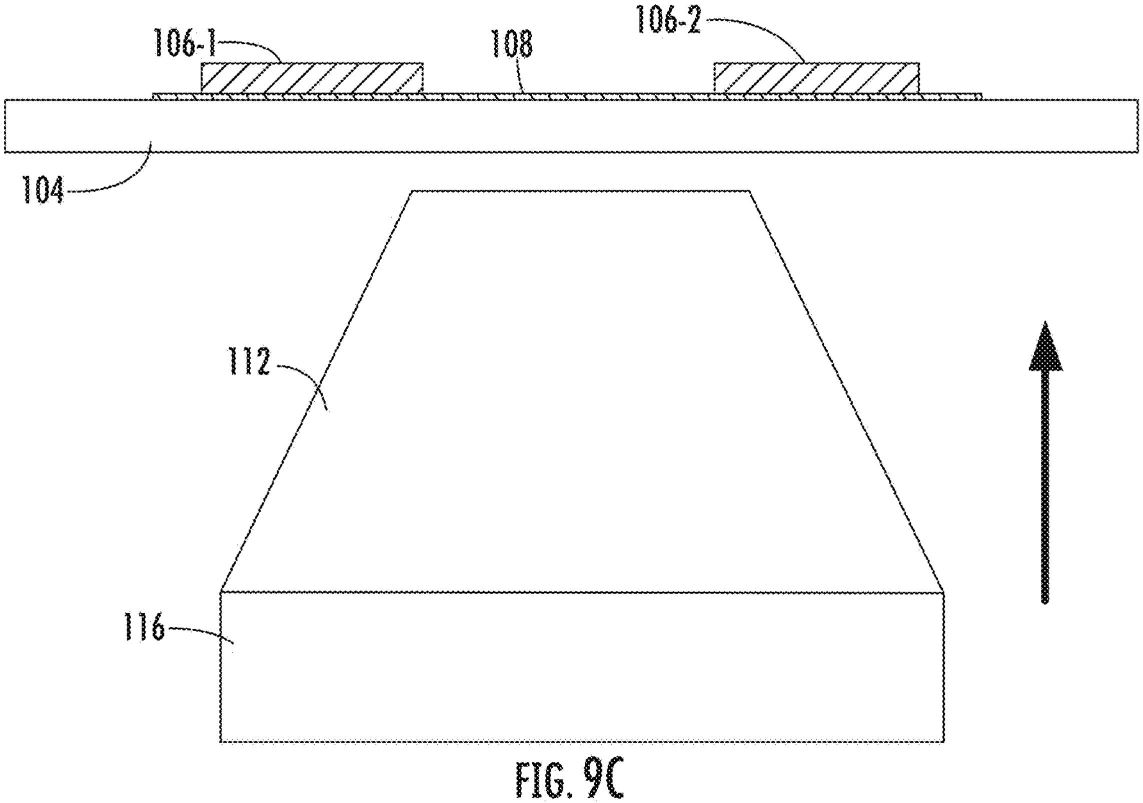

FIG. 9C depicts a punch 116 that can be pushed through the submount 104 to push the submount portions 102 into their raised positions. In an embodiment, the punch 116 can optionally include the heatsink 112 that can be left behind when the punch retracts.

Figure 9D:
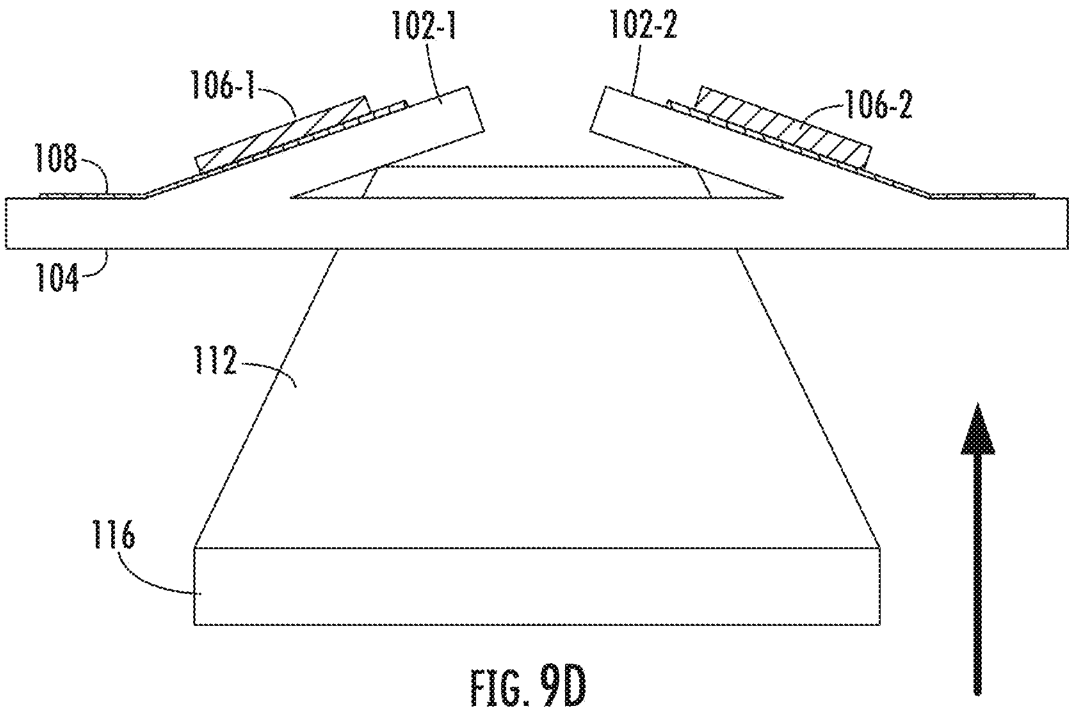

FIG. 9D depicts the punch 116 when the punch is just beginning to punch through the submount 104 and the submount portions 102 are being raised into position. The end position of the punch 116, which controls the angle of the submount portions, can be controlled based on a predetermined angle of the plurality of submount portions 102 with respect to the remainder of the submount 104.

Figure 9E:
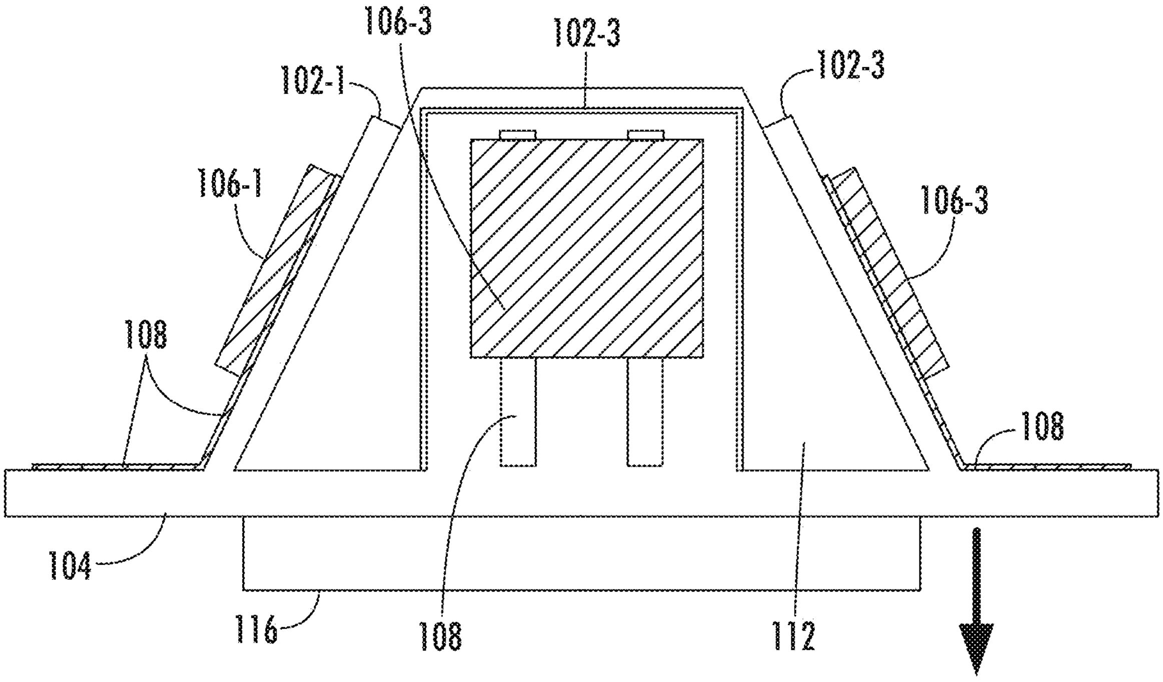

In FIG. 9E, the punch 116 can be retracted. In the embodiment where there is a heatsink on the tip of the punch, the heatsink 112 can be left behind, forming the embodiment similar in FIG. 3. In other embodiments, where there is no heatsink on the tip of the punch 116, the embodiment formed can be similar to the embodiment in FIG. 1A. Alternatively, the heatsink 112 can be placed in the recess 103 after the punch 116 is retracted.

The submount portions 102 can be scored, either completely or partially, in order to facilitate a clean separation between the submount portions 102 and the remainder of the submount 104. While the punch 116 is pushing the submount portions 102 into position, the submount material can either flex or partially tear. The electrical traces 108 can also flex or bend while being manipulated.

In other embodiments, the electrical traces 108 on the submount portion 102 may not touch the electrical traces 108 on the remainder of the submount 104 when the submount portions 102 are flat, but after being punched, the electrical traces 108 can be moved closer to each other such that an electrical connection is formed.

Figure 10A:
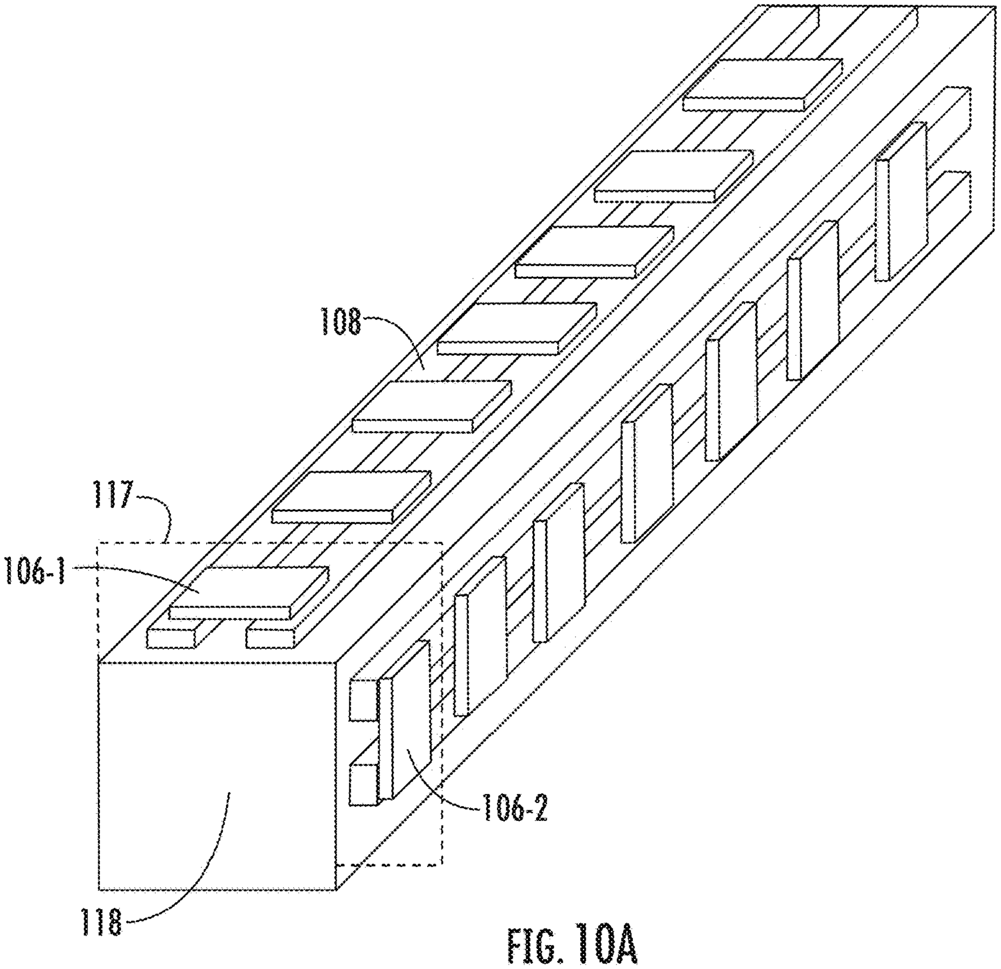
FIGS. 10A-10C depict a series of illustrations showing another method of forming an LED device with a plurality of LED chips that are angled with respect to each other according to aspects disclosed herein.
Figure 10B:
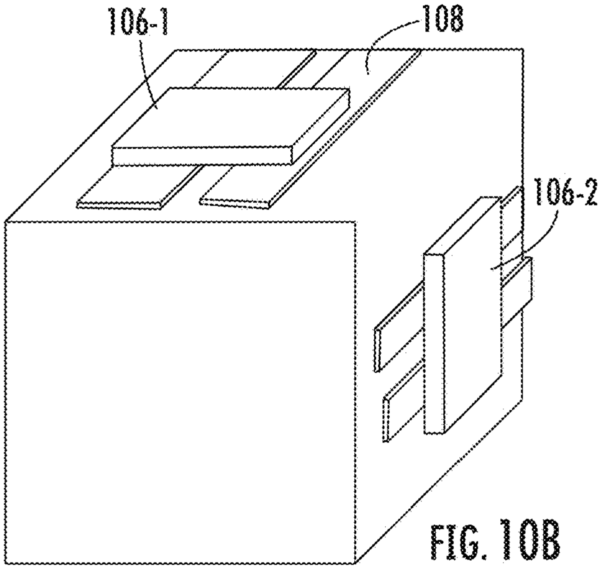
Figure 10C:
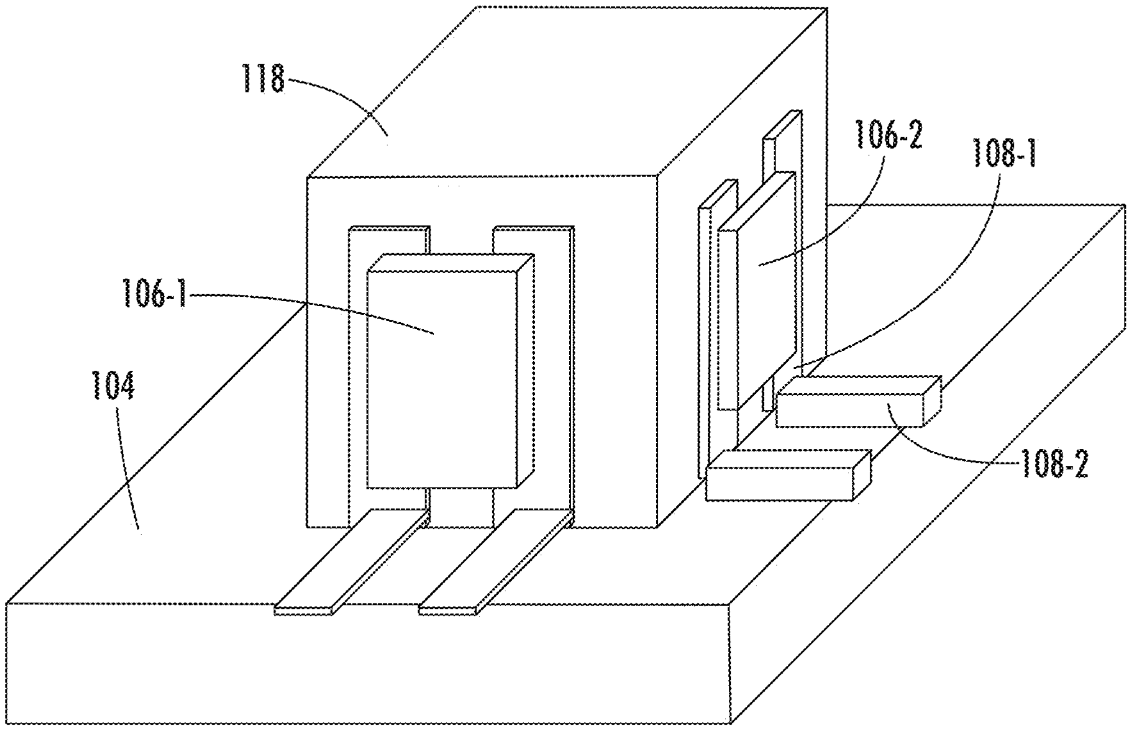

FIGS. 10A-10C depict a series of illustrations showing another method of forming an LED device with a plurality of LED chips that are angled with respect to each other according to aspects disclosed herein.

The embodiments shown in FIGS. 10A-10C are another way of achieving a 3D LED component where the LED chips are mounted in different orientations. In the embodiment depicted, a rod 118 can have a plurality of sides (four in this embodiment, each of which has LED chips (e.g., 106-1 and 106-2) mounted on the electrical traces 108 on the surface of the rod 118. Different portions of the rod 118 can be cut or separated along plane 117 to form 3D LED components as shown in FIG. 10B that have the LED chips 106 mounted thereon, and as shown in FIG. 10C, the 3D LED components can then be mounted on a submount 104 that already has electrical traces placed thereon. The electrical trace of the 3D LED component (e.g., 108-1) can then form an electrical contact with the electrical trace 108-2 of the submount 104.

Figure 11:
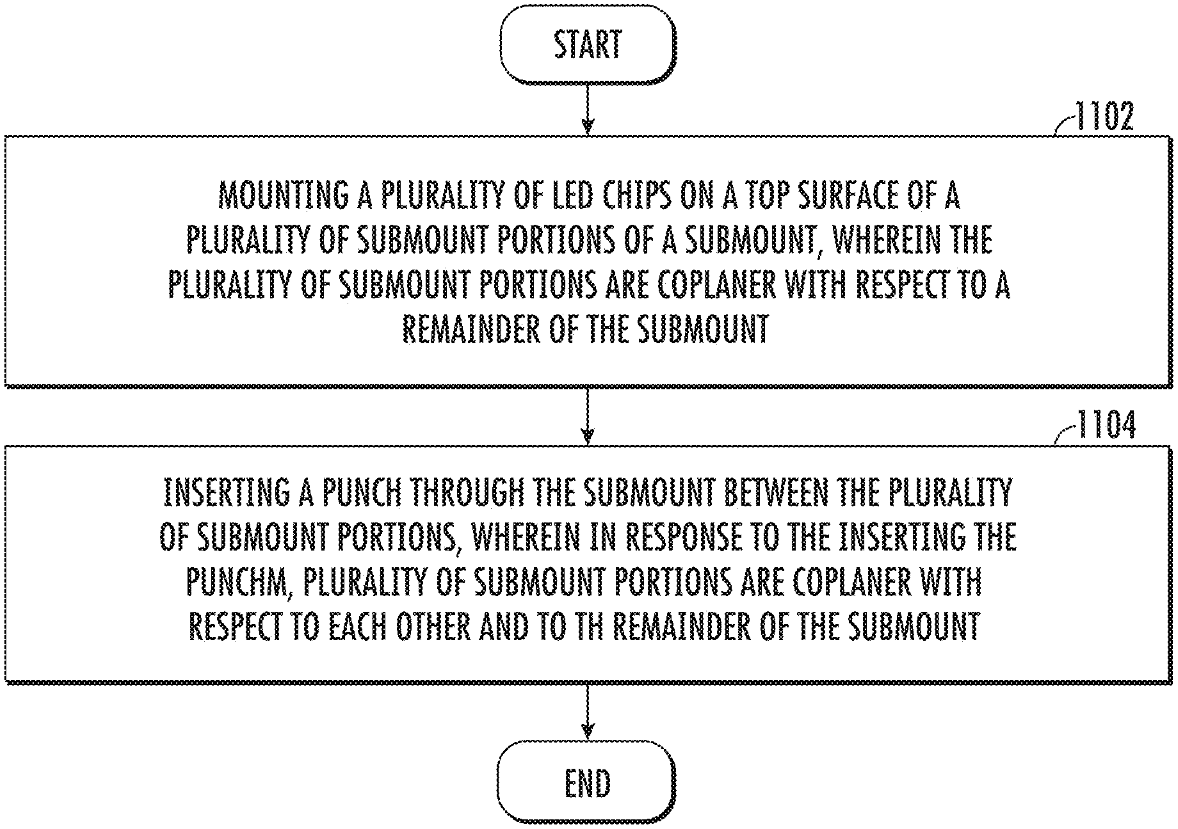
FIG. 11 is a flowchart of a method for forming an LED device with a plurality of LED chips that are angled with respect to each other according to aspects disclosed herein.

FIG. 11 is a flowchart of a method for forming an LED device with a plurality of LED chips that are angled with respect to each other according to aspects disclosed herein.

The method can begin at step 1102 where the method includes mounting a plurality of LED chips on a top surface of a plurality of submount portions of a submount, wherein the plurality of submount portions are coplanar with respect to a remainder of the submount. In an embodiment, the plurality of LED chips are mounted on electrical traces that flex in response to inserting the punch.

At step 1104, the method includes inserting a punch through the submount between the plurality of submount portions, wherein in response to the inserting the punch, the plurality of submount portions are angled with respect to each other and to the remainder of the submount. Before the punch is inserted, the edges of the plurality of submount portions can be scored.

The end position of the punch 116, which controls the angle of the submount portions, can be controlled based on a predetermined angle of the plurality of submount portions 102 with respect to the remainder of the submount 104.

A heat sink can be placed between the plurality of submount portions, such that the heatsink is in contact with a surface of each submount portion of the plurality of submount portions. In an embodiment, the method can further include detaching the heatsink from the punch, wherein the heatsink is in contact with, and connected to surfaces of the plurality of submount portions before retracting the punch.

According to an embodiment, to form the embodiment shown in FIG. 1A where the submount portions 102 are angled facing away from each other, the punch can be inserted through a bottom surface of the plurality of submount portions, causing a top surface of plurality of submount portions to be angled away from the punch.

Alternatively, to form the embodiment shown in FIG. 8 where the submount portions 102 are angled facing each other, the punch can be inserted through a top surface of the plurality of submount portions, causing a top surface of plurality of submount portions to be angled towards the punch. In other embodiments, one or more punches can individually punch each submount portion of the plurality of submount portions, one at a time, so as to avoid damaging the submount or metallic electrical traces 108. In other embodiments, each submount portion 102 of the plurality of submount portions 102 can be pulled from the top side, by a claw, in order to place the submount portion 102 in position as shown in FIG. 8.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of fabricating a light-emitting diode (LED) device, comprising:

mounting a plurality of LED chips on a top surface of a plurality of submount portions of a submount, wherein the plurality of submount portions are coplanar with respect to a remainder of the submount; and inserting a punch through the submount between the plurality of submount portions, wherein in response to the inserting the punch, the plurality of submount portions are angled with respect to each other and to the remainder of the submount.

2. The method of claim 1, further comprising scoring one or more edges of the plurality of submount portions prior to inserting the punch.

3. The method of claim 1, wherein the plurality of LED chips are mounted on electrical traces that flex in response to the inserting the punch.

4. The method of claim 1, further comprising:

controlling a distance through which the punch is inserted through the submount based on a predetermined angle of the plurality of submount portions with respect to the remainder of the submount.

5. The method of claim 1, further comprising:

placing a heat sink between the plurality of submount portions, such that the heatsink is in contact with a surface of each submount portion of the plurality of submount portions.

6. The method of claim 1, wherein the punch comprises a heatsink at a tip of the punch, and the method further comprises:

detaching the heatsink from the punch, wherein the heatsink is in contact with, and connected to surfaces of the plurality of submount portions; and retracting the punch.

7. The method of claim 1, wherein the inserting the punch comprises:

inserting the punch through a bottom surface of the plurality of submount portions, causing a top surface of plurality of submount portions to be angled away from the punch.

8. The method of claim 1, wherein the inserting the punch comprises:

inserting the punch through a top surface of each of the plurality of submount portions, one at a time, causing a top surface of plurality of submount portions to be angled towards the punch.

9. The method of claim 1, wherein each submount portion of the plurality of submount portions comprises a plurality of LED chips mounted thereon.

10. The method of claim 9, wherein each LED chip of the plurality LED chips is configured to emit a different color light.

11. The method of claim 1, wherein the plurality of submount portions are at least one of a triangular or quadrilateral shape.

* * * * *